(12) United States Patent
Takano et al.

(10) Patent No.: US 6,184,604 B1
(45) Date of Patent: Feb. 6, 2001

(54) BRAKE MECHANISM AND POWERED ACTUATOR

(75) Inventors: Tomohiro Takano; Takumi Miyazaki, both of Tokyo (JP)

(73) Assignee: Yamatake - Honeywell Co., Ltd., Tokyo (JP)

(*) Notice: Under 35 U.S.C. 154(b), the term of this patent shall be extended for 0 days.

(21) Appl. No.: 09/553,517

(22) Filed: Apr. 20, 2000

Related U.S. Application Data

(63) Continuation of application No. 08/975,287, filed on Nov. 20, 1997, now abandoned.

(30) Foreign Application Priority Data

Dec. 2, 1996 (JP) .................................................. 8-321582

(51) Int. Cl.$^7$ .................................................. H02K 7/10
(52) U.S. Cl. ............................ 310/77; 318/759; 318/376; 251/77; 251/129.13
(58) Field of Search ............................ 310/77; 318/759, 318/376; 251/72, 124.13

(56) References Cited

U.S. PATENT DOCUMENTS

| | | | |
|---|---|---|---|
| 3,585,476 | * | 6/1971 | Rutchik .................................. 318/249 |
| 3,666,039 | * | 5/1972 | Bachle et al. ........................ 180/197 |
| 3,761,851 | * | 9/1973 | Nelson .................................. 335/253 |
| 3,872,363 | * | 3/1975 | Gross .................................... 318/762 |
| 3,897,595 | * | 7/1975 | Fearno .................................. 318/762 |
| 3,970,980 | * | 7/1976 | Nelson .................................. 335/253 |
| 3,978,523 | * | 8/1976 | Tanaka et al. ........................ 360/121 |
| 4,054,821 | * | 10/1977 | Williamson ........................... 318/375 |
| 4,087,727 | * | 5/1978 | Horiuchi et al. ..................... 318/376 |
| 4,185,770 | * | 1/1980 | Nagel .................................... 236/1 G |
| 4,417,288 | * | 11/1983 | Hattori et al. ........................ 360/74.1 |
| 4,831,469 | * | 5/1989 | Hanson et al. ........................ 360/75 |
| 5,081,405 | * | 1/1992 | Nelson .................................. 318/448 |
| 5,195,721 | * | 3/1993 | Akkerman ........................ 251/129.13 |
| 5,310,021 | * | 5/1994 | Hightower .......................... 185/40 R |
| 5,598,072 | * | 1/1997 | Lambert ............................... 318/376 |
| 5,751,087 | * | 5/1998 | Yang .................................... 310/179 |

FOREIGN PATENT DOCUMENTS

| | | |
|---|---|---|
| 1600671 | 1/1970 | (DE) . |
| 0512139 | 11/1992 | (EP) . |
| 0697571 | 2/1996 | (EP) . |
| 7-21978 | 5/1995 | (JP) . |

OTHER PUBLICATIONS

Patent Abstracts of Japan, vol. 013, No. 267, Jun. 20, 1989.
Patent Abstracts of Japan, vo. 006, No. 081, May 19, 1982.

* cited by examiner

*Primary Examiner*—Thomas M. Dougherty
*Assistant Examiner*—Joseph Waks
(74) *Attorney, Agent, or Firm*—Blakely Sokoloff Taylor & Zafman

(57) ABSTRACT

A brake mechanism includes a reduction gear train, a motor structure, and a braking means. The reduction gear train transmits at least a rotation force in a first rotational direction supplied from a drive source. The reduction gear train is imparted with a returning tendency in a second rotational direction opposite to the first rotational direction. The motor structure has an output shaft rotatably connected to the reduction gear train. The braking means has field magnets, an armature coil, a braking circuit, and either one of a fixed resistor, a variable resistor, a rectifying diode, a Zener diode, a varister, a constant-current diode, a light-emitting diode, and a lamp bulb. The braking means generates a torque in the first rotational direction to the output shaft which, upon being disconnected from the drive source, rotates to return in the second rotational direction through the reduction gear train in accordance with the returning tendency, thereby suppressing a returning rotation speed of the reduction gear train.

16 Claims, 13 Drawing Sheets

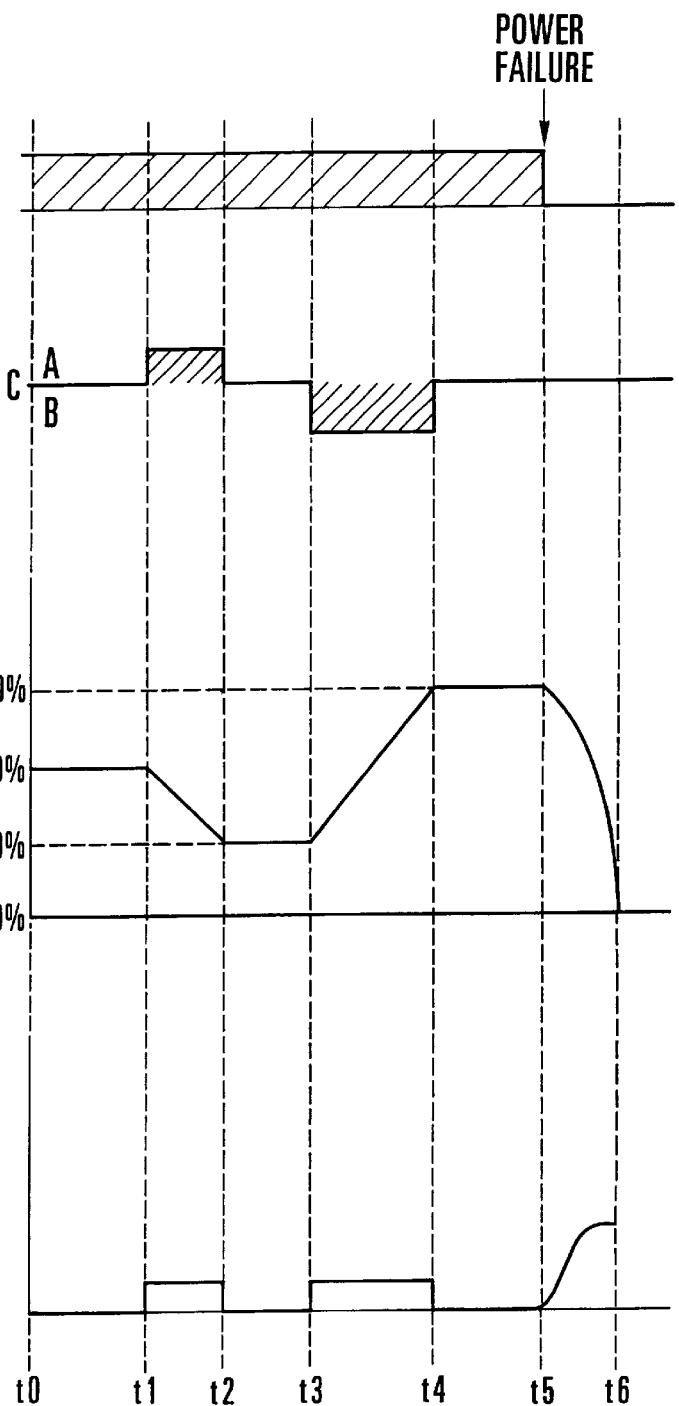

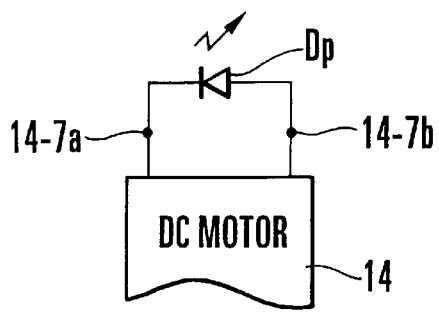
F I G. 11A
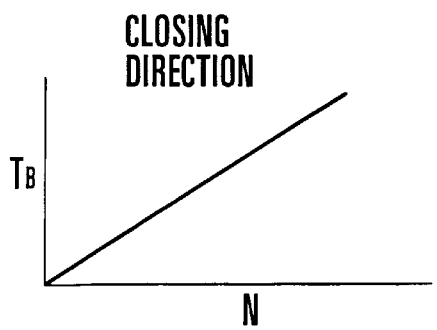
F I G. 11B
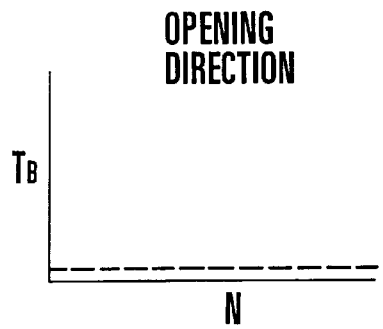
F I G. 11C
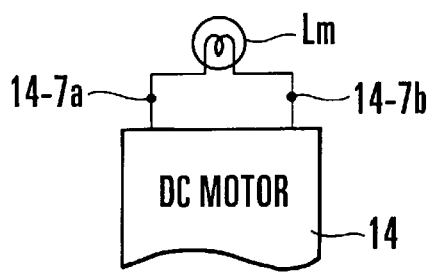
F I G. 12A
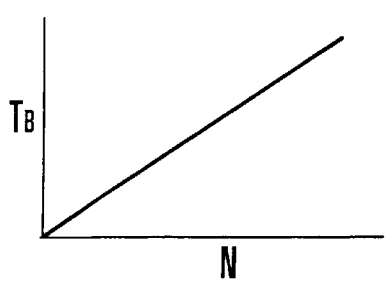
F I G. 12B
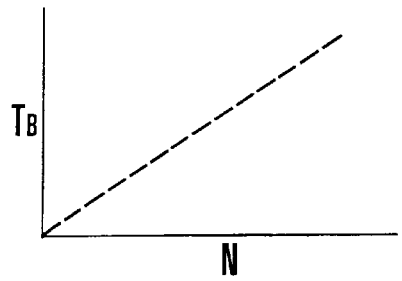
F I G. 12C

BRAKE MECHANISM AND POWERED ACTUATOR

This is a continuation of application Ser. No. 08/975,287, filed Nov. 20, 1997.

BACKGROUND OF THE INVENTION

The present invention relates to a brake mechanism for suppressing the operation speed of an operation end such as a valve or damper provided with a return spring, and a powered actuator having this brake mechanism.

As a conventional powered actuator, a spring return type actuator having a valve or damper as the operation end is used. In this spring return type actuator, the rotation force of a drive motor is transmitted to the operation end through a reduction mechanism to increase the torque, thereby opening/closing the valve or damper constituting the operation end. The valve or damper is provided with a return spring. When power is not supplied to the drive motor because of a power failure or the like, the valve or damper is forcibly fully closed or opened with the force (restoration force) of the return spring. During the return operation of fully closing or opening the valve or damper forcibly, a braking force (brake torque) is effected to moderate impact generated during the full-closing or full-opening operation. An example of the braking method during this return operation includes the following and the like.

I. Inertia braking method employing weight

II. Governor method utilizing friction

III. Impeller method utilizing air resistance

I. Inertia Braking Method Employing Weight

With this method, as shown in FIG. 16A, a brake mechanism 1 having a disk 1-1 is rotationally connected midway along a power transmission line connected to an operation end. Weights 1-2A and 1-2B are arranged on the disk 1-1 and are connected to the rotation center through springs 1-3A and 1-3B. This increases the moment of inertia during the return operation and suppresses an increase in operation speed of the operation end. In this case, the moment of inertia can be changed by a centrifugal force, i.e., the rotation speed, and it is estimated that a brake torque $T_B$ be substantially constant with respect to a rotation speed N, as shown in FIG. 16B. Accordingly, the operation speed (return speed) of the operation end from the start of return to the end of return will show the characteristics as shown in FIG. 16C.

The characteristics shown in FIG. 16C are expressed by:

$$d\omega/dt = (TS - TB)/J$$

The moment J of inertia increases in proportion to the second power of the speed, and the brake torque $T_B$ is constant regardless of the rotation speed.

II. Governor Method Utilizing Friction

With this method, as shown in FIG. 17A, a brake mechanism 2 having a case 2-1 is rotationally connected midway along a power transmission line connected to an operation end. Drums 2-2A and 2-2B are arranged in the case 2-1 and are connected to the rotation center through springs 2-3A and 2-3B. During the return operation, the drums 2-2A and 2-2B are pulled in the radially outward direction by a centrifugal force to generate friction between them and the case 2-1, thereby suppressing an increase in operation speed of the operation end. In this case, it is estimated that a brake torque $T_B$ increase from a rotation speed $N_0$, with which the drums 2-2A and 2-2B start to cause friction with the case 2-1, in substantially proportional to a rotation speed N, as shown in FIG. 17B. Accordingly, the return speed of the operation end from the start of return to the end of return will show the characteristics as shown in FIG. 17C.

The characteristics shown in FIG. 17C are expressed by:

$$d\omega/dt = (TS - TB)/J$$

The brake torque $T_B$ is constant when the rotation speed is equal to or smaller than a predetermined value, and is variable when the rotation speed exceeds the predetermined value.

III. Impeller Method Utilizing Air Resistance

With this method, as shown in FIG. 18A, a brake mechanism 3 having an impeller 3-1 is rotationally connected midway along a power transmission line connected to an operation end. During the return operation, the impeller 3-1 rotates to generate a braking force caused by an air resistance, thereby suppressing an increase in operation speed of the operation end. In this case, it is estimated that a brake torque $T_B$ increase in substantially proportional to a rotation speed N, as shown in FIG. 18B. Accordingly, the return speed of the operation end from the start of return to the end of return will show the characteristics as shown in FIG. 18C.

The characteristics shown in FIG. 18C are expressed by:

$$d\omega/dt = (TS - TB)/J$$

The brake torque $T_B$ can be changed in accordance with the rotation speed.

According to the conventional spring return type actuators of this type, however, since a braking force proportional to the rotation speed N cannot be obtained in the inertia braking method I, a stable operation speed cannot be obtained in the return operation of an operation end. Since the portion for generating the braking force causes friction in the governor method II, performance degradation occurs due to the friction. Since a braking force with respect to a shape is limited in the impeller method III, a large braking force cannot be obtained, and a large shape is required to obtain a large braking force. In any method, the structure is complicated to change the return time of the operation end.

SUMMARY OF THE INVENTION

It is an object of the present invention to provide a brake mechanism and a powered actuator, capable of obtaining a stable braking force proportional to a rotation speed.

It is another object of the present invention to provide a brake mechanism and a powered actuator, capable of obtaining a large braking force in a compact structure.

It is still another object of the present invention to provide a brake mechanism and a powered actuator, capable of changing the return time of an operation end.

In order to achieve the above objects of the present invention, there is provided a brake mechanism comprising a rotation transmitting mechanism for transmitting at least a rotation force in a first rotational direction supplied from a drive source, the rotation transmitting mechanism being imparted with a returning tendency in a second rotational direction opposite to the first rotational direction, a motor structure having an output shaft rotatably connected to the rotation transmitting mechanism, and braking means for generating a torque in the first rotational direction to the output shaft which, upon being disconnected from the drive source, rotates to return in the second rotational direction through the rotation transmitting mechanism in accordance with the returning tendency, thereby suppressing a returning rotation speed of the rotation transmitting mechanism.

BRIEF DESCRIPTION OF THE DRAWINGS

FIGS. 4A to 4D are timing charts for explaining the operation of the spring return type actuator shown in FIGS. 2 and 3;

FIG. 11A, and FIGS. 11B and 11C are a connection diagram and graphs, respectively, for explaining the first light-emitting element method for obtaining a brake torque $T_B$;

FIG. 12A, and FIGS. 12B and 12C are a connection diagram and graphs, respectively, for explaining the second light-emitting element method for obtaining a brake torque $T_B$;

DESCRIPTION OF THE PREFERRED EMBODIMENTS

The present invention will be described in detail with reference to the accompanying drawings.

[First Embodiment]

Figure 2:
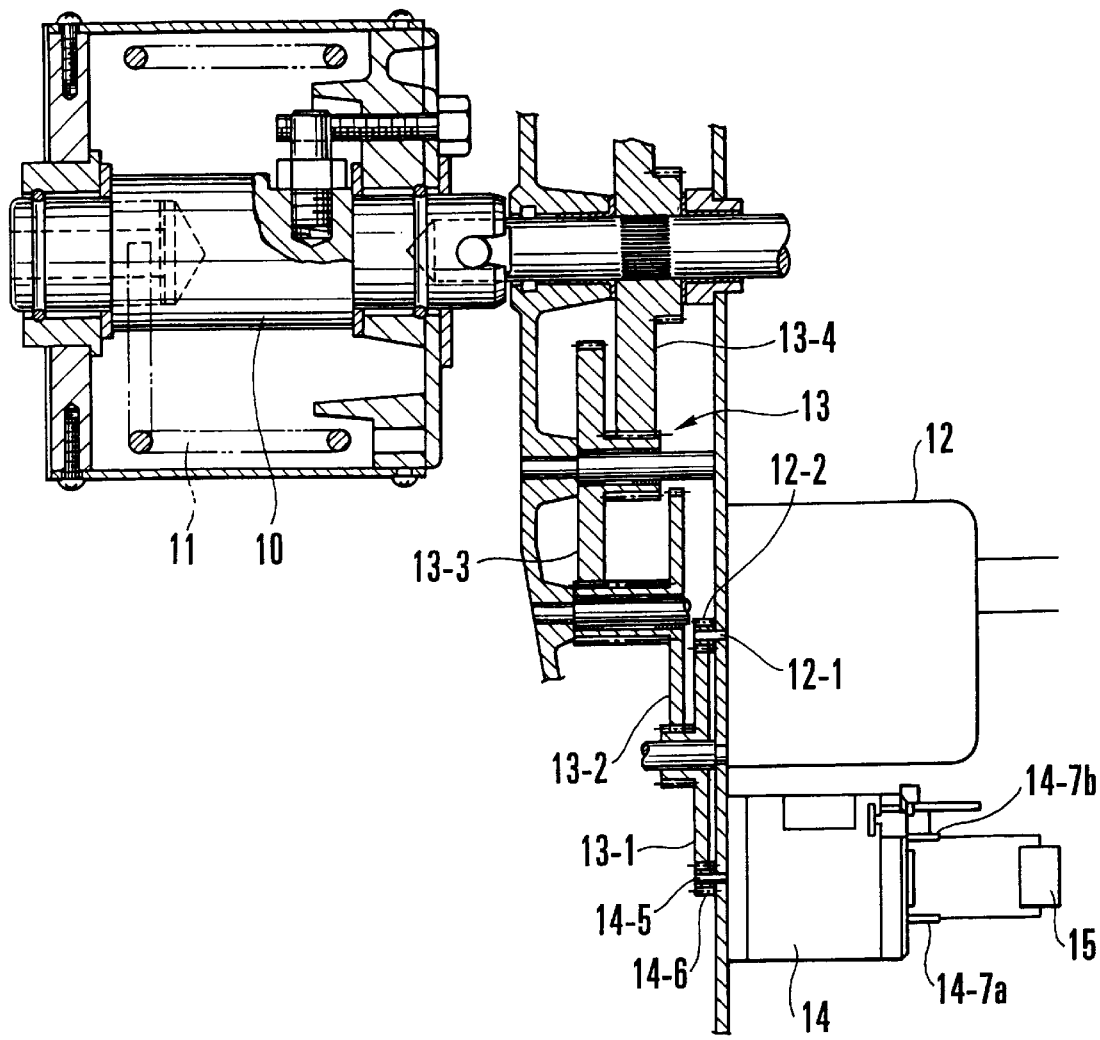
FIG. 2 is a partially sectional side view of a spring return type actuator according to the first embodiment of the present invention.

FIG. 2 shows a powered actuator (spring return type actuator) according to the first embodiment of the present invention. Referring to FIG. 2, reference numeral 10 denotes a valve serving as an operation end; 11, a return spring provided to the valve 10; 12, a drive motor; 13, a reduction gear train; 14, a DC motor structure; and 15, a braking circuit.

As the drive motor 12, a synchro motor having a clutch is used. While the clutch is connected, an output shaft 12-1 of the drive motor 12 is rotatably connected to the valve 10 through the reduction gear train 13. The reduction gear train 13 is constituted by a first-stage reduction gear 13-1 meshing with a pinion 12-2 press-fitted on the output shaft 12-1 of the drive motor 12, a second-stage reduction gear 13-2 meshing with the reduction gear 13-1, a third-stage reduction gear 13-3 meshing with the reduction gear 13-2, and a fourth-stage reduction gear 13-4 meshing with the reduction gear 13-3. When a drive motor not incorporating a clutch is used as the drive motor 12, a clutch is externally mounted.

Figure 1A:
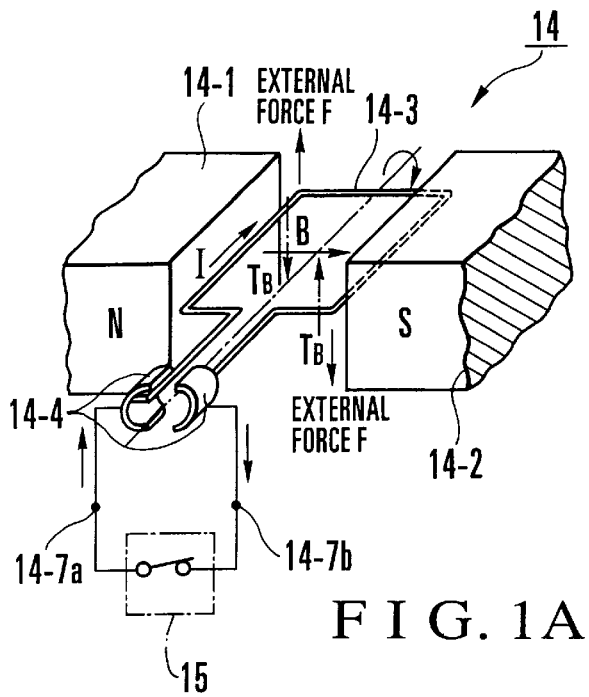
FIG. 1A is a view showing the basic structure of a DC motor structure used in a spring return type actuator shown in FIG. 2, FIGS. 1B and 1C are graphs showing the characteristics of the DC motor structure shown in FIG. 1A.

FIG. 1A shows the basic structure of the DC motor structure 14. As shown in FIG. 1A, the DC motor structure 14 has field magnets 14-1 and 14-2, an armature coil 14-3, and a brush 14-4. As shown in FIG. 2, a pinion 14-6 is press-fitted on a rotating shaft (output shaft) 14-5 of an armature (not shown) on which the armature coil 14-3 is wound, and the pinion 14-6 meshes with the reduction gear 13-1. More specifically, the output shaft 14-5 of the DC motor structure 14 is rotatably connected midway along a transmission line that transmits power from the drive motor 12 to the valve 10 through the reduction gear train 13. As shown in FIG. 1A, terminals 14-7a and 14-7b connected to the brush 14-4 of the DC motor structure 14 are short-circuited in a braking circuit 15.

Figure 3:
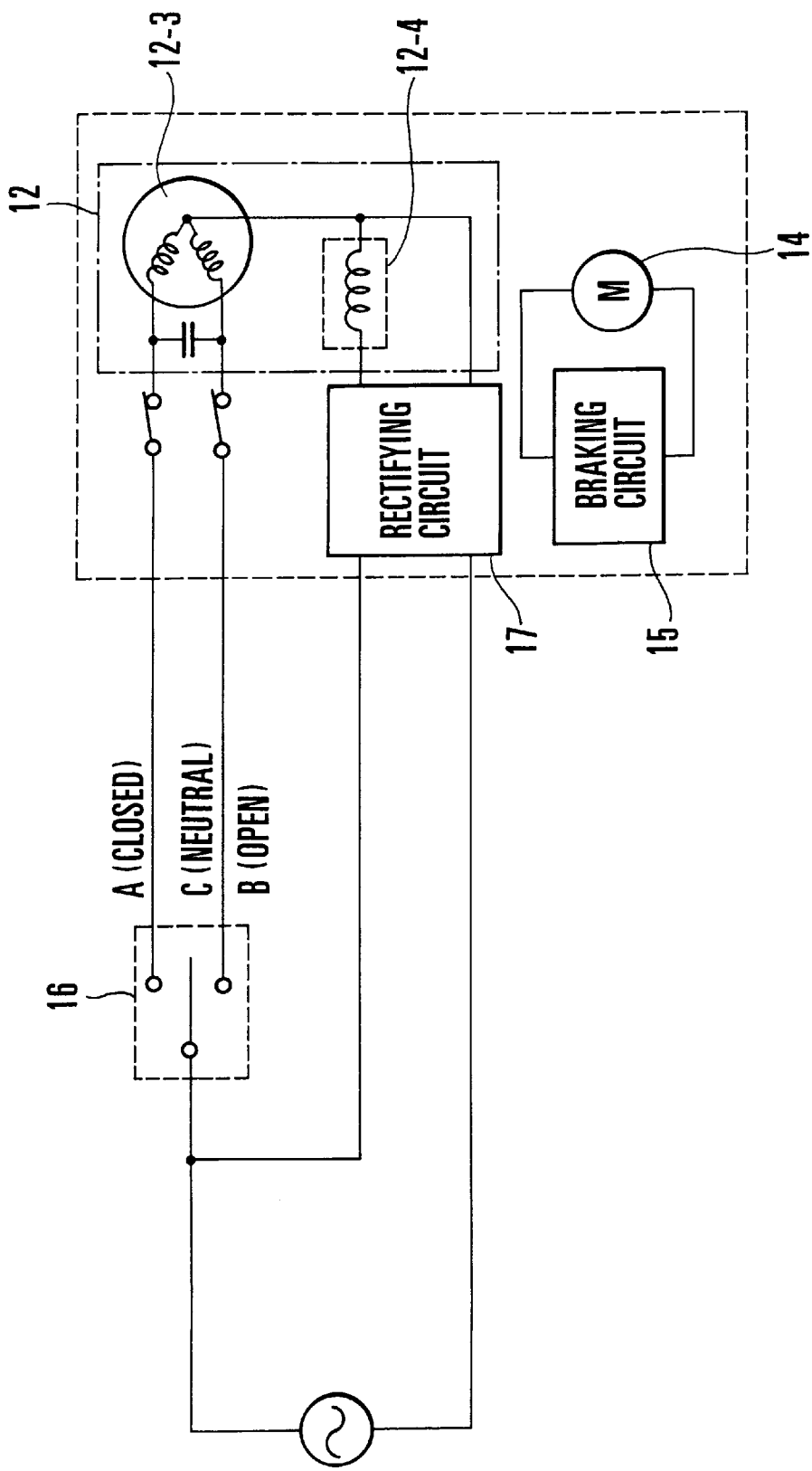
FIG. 3 is an electrical circuit diagram of the spring return type actuator shown in FIG. 2.

FIG. 3 shows the spring return type actuator shown in FIG. 2. Referring to FIG. 3, reference numeral 12-3 denotes the motor coil of the drive motor 12; 12-4, a clutch coil incorporated in the drive motor 12; 16, an operation selector switch for switching the rotational direction of the drive motor 12; and 17, a rectifying circuit which receives power (AC power) to be supplied to the drive motor 12 as a shunt input and generates DC power to be supplied to the clutch coil 12-4. The rectifying circuit 17 and the clutch coil 12-4 constitute a clutch drive circuit.

The operation of the spring return type actuator described above will be described with reference to the timing charts shown in FIGS. 4A to 4D. A case wherein the valve 10 is a proportional valve will be described. As the drive motor 12, one which can ensure the position of the valve 10 with the holding torque of the motor itself, when power is not supplied to the motor while the clutch is connected, is used. As the operation selector switch 16, one which can switch to a neutral position (neutral) C as well as to the A side (closed side) and B side (open side) is used.

As shown in FIG. 4B, at point t0, if the operation selector switch 16 is located at the neutral position, the AC power supply is in the power supply state (FIG. 4A) and the opening degree of the valve 10 is 50% (FIG. 4C). In this case, DC power is supplied to the clutch coil 12-4 through the rectifying circuit 17. Since the clutch incorporated in the drive motor 12 is connected, the opening degree of the valve 10 is ensured at 50% by the holding torque of the motor itself.

From this state, at point t1, when the operation selector switch 16 is switched to the A side, as shown in FIG. 4B, the drive motor 12 is rotated in the reverse direction. This reverse rotation force is transmitted to the valve 10 through the reduction gear train 13 to move it in the closing direction. The reverse rotation force from the drive motor 12 is transmitted to the DC motor structure 14 through the reduction gear train 13 to rotate its output shaft 14-5.

When the output shaft 14-5 of the DC motor structure 14 is rotated by an external force F, the DC motor structure 14 serves as a generator to cause a counter electromotive force. In this case, since the terminals 14-7a and 14-7b are short-circuited in the braking circuit 15, a current I generated in the armature coil 14-3 of the DC motor structure 14 is flowed to the armature coil 14-3. Fleming's left-hand rule is effected, and a torque (brake torque) $T_B$ in a direction opposite to the direction of rotation caused by the external force F is generated.

Figure 1C:
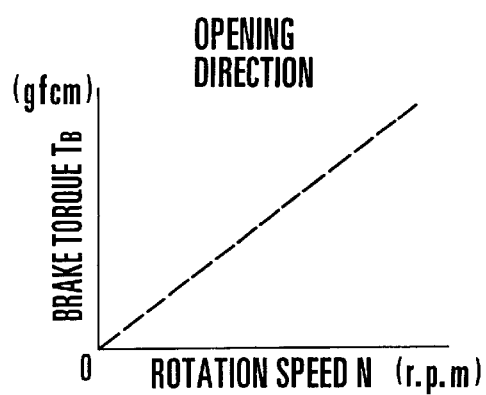
FIG. 1D is a graph showing the characteristics of the actuator shown in FIG. 2.
Figure 1B:
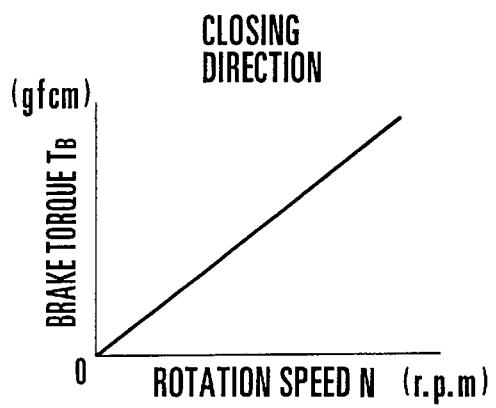

When the output shaft 14-5 of the DC motor structure 14 rotates upon reception of the reverse rotation force from the drive motor 12 as the external force F, a brake torque $T_B$ in a direction opposite to the direction of rotation caused by the external force F is generated during a period from t1 to t2, as shown in FIG. 4D. This brake torque $T_B$ is proportional to a rotation speed N, as shown in FIG. 1B. Since the rotation speed N at this time is low, the brake torque $T_B$ is not very large.

As shown in FIG. 4B, when the operation selector switch 16 is set at the neutral position C again at point t2, the reverse rotation of the drive motor 12 is stopped. In this case, the valve 10 is stopped at an opening degree of 20%, and this state with the opening degree of 20% is held by the holding torque of the drive motor 12. Since the drive motor 12 is stopped, the counter electromotive force generated in the DC motor structure 14 disappears, and the brake torque $T_B$ also disappears.

As shown in FIG. 4B, when the operation selector switch 16 is switched to the B side at point t3, the drive motor 12 is rotated in the forward direction, and this forward rotation force is transmitted to the valve 10 through the reduction gear train 13 to operate the valve 10 in the opening direction. At this time, the forward rotation force from the drive motor 12 is transmitted to the DC motor structure 14 through the reduction gear 13-1 to rotate its output shaft 14-5.

Accordingly, with the forward rotation force from the drive motor 12 as the external force F, Fleming's left-hand rule is effected in the same manner as in reverse rotation of the drive motor 12. As shown in FIG. 4D, a brake torque $T_B$ in a direction opposite to the direction of rotation caused by the external force F is generated during a period from $t_3$ to $t_4$, as shown in FIG. 4D. This brake torque $T_B$ is proportional to the rotation speed N, as shown in FIG. 1C. Since the rotation speed N at this time is low, the brake torque $T_B$ is not very large.

As shown in FIG. 4B, when the operation selector switch 16 is switched to the neutral position C at point $t_4$, the forward rotation of the drive motor 12 is stopped. In this case, the valve 10 is stopped at an opening degree of 80%, and this state with the opening degree of 80% is held by the holding torque of the drive motor 12. Since the drive motor 12 is stopped, the counter electromotive force generated in the DC motor structure 14 disappears, and the brake torque $T_B$ also disappears.

Assume that a power failure occurs at point t5, as shown in FIG. 4A, and that AC power supply to the drive motor 12 is disconnected. In this case, although the drive motor 12 is stopped since the operation selector switch 16 is located at the neutral position C, as the power supply is OFF, DC power supply to the clutch coil 12-4 is disconnected, and the clutch is disconnected. Therefore, the holding torque caused by the drive motor 12 disappears, and the valve 10 tries to return in the closing direction at a high speed with the restoring force of the return spring 11.

At this time, however, the restoring force of the return spring 11 is transmitted to the DC motor structure 14 through the reduction gear train 13, and the output shaft 14-5 of the DC motor structure 14 starts to rotate. At this time, during a period from t5 to t6, a brake torque $T_B$ in a direction opposite to the direction of rotation caused by the restoring force F supplied from the return spring 11 is generated in the DC motor structure 14, as shown in FIG. 4D. This brake torque $T_B$ is proportional to the rotation speed N, as shown in FIG. 1B. Since the rotation speed N at this time is high, the brake torque $T_B$ is large, and the return speed of the valve 10 is moderated largely.

Figure 1D:
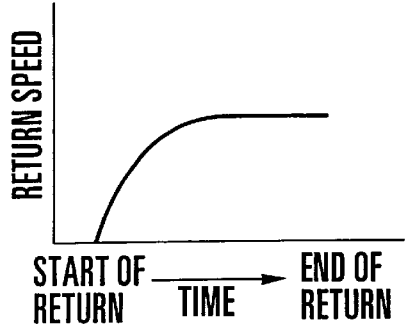

The nearer the end of return, the more constant the return speed of the valve 10 from the start of return to the end of return becomes, as shown in FIG. 1D. The characteristics shown in FIG. 1D are expressed by:

$$d\omega/dt=(TS(\theta)-TB)/J$$

The brake torque $T_B$ can be changed in accordance with the rotation speed.

When the return ends, the valve 10 is stopped at a position with an opening degree of 0% at point $t_6$, as shown in FIG. 4C. Since the valve 10 is stopped, the counter electromotive force generated in the DC motor structure 14 disappears, and the brake torque $T_B$ also disappears.

As described above, according to this embodiment, the brake torque $T_B$ proportional to the rotation speed N can be obtained, so that a stable operation speed can be obtained during the return operation of the valve 10. More specifically, the load does not become very large during the normal operation (low-speed rotation) of the valve 10, and a large braking force acts during the return operation (high-speed rotation) to obtain a sufficiently long return time, thereby decreasing impact occurring in the full-closing operation. The brake torque $T_B$ is obtained not through friction, as in the governor method, but is obtained electrically. Therefore, the performance does not degrade, and a brake torque $T_B$ proportional to the rotation speed can be obtained stably. A large brake torque $T_B$ can be obtained with a compact structure without increasing the size as in the impeller method.

Although the terminals 14-7a and 14-7b of the DC motor structure 14 are short-circuited in the braking circuit 15 in the above embodiment, they need not be always short-circuited. With short-circuiting, no loss is caused by a resistor, and the best braking efficiency can be obtained accordingly. The number of components is small to decrease the cost. The characteristics are the same both in the opening and closing directions, and the brake torque $T_B$ can be obtained in proportion to the rotation speed. Other than the short-circuiting method, methods to be described below are possible. These methods are basic ones and can be used alone as well as in combination of various types of methods.

[Resistor Element Method]

Figure 5A:
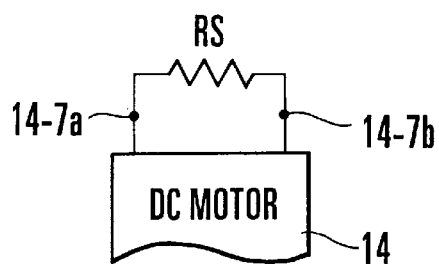
FIG. 5A, and FIGS. 5B and 5C are a connection diagram and graphs, respectively, for explaining the resistor element method for obtaining a brake torque $T_B$.
Figure 5B:
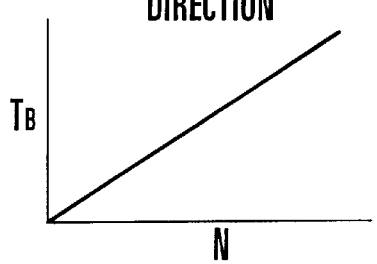
Figure 5C:
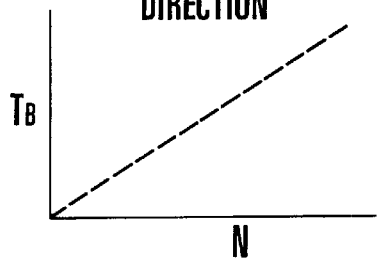

As shown in FIG. 5A, a fixed resistor Rs is connected between the terminals 14-7a and 14-7b of the DC motor structure 14. During the operation of the valve 10 in the opening and closing directions, a brake torque $T_B$ in a direction opposite to the rotational direction and proportional to the rotation speed N is generated in the DC motor structure 14 to suppress the operation speed of the valve 10. In this case, predetermined braking characteristics (the characteristics of the brake torque $T_B$ with respect to the rotation speed N) can be obtained depending on the resistance of the fixed resistor Rs. FIGS. 5B and 5C show the braking characteristics in the closing and opening directions, respectively. This method can be realized most easily when the characteristics of the brake torque $T_B$ and rotation speed N are predetermined.

[Variable Resistor Element Method]

Figure 6A:
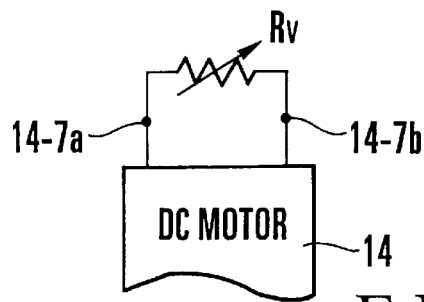
FIG. 6A, and FIGS. 6B and 6C are a connection diagram and graphs, respectively, for explaining the variable resistor element method for obtaining a brake torque $T_B$.
Figure 6B:
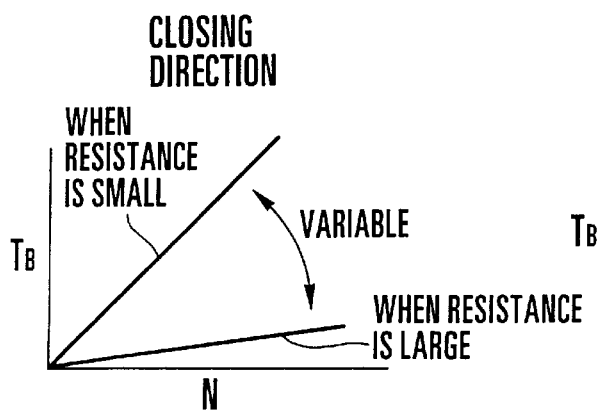
Figure 6C:
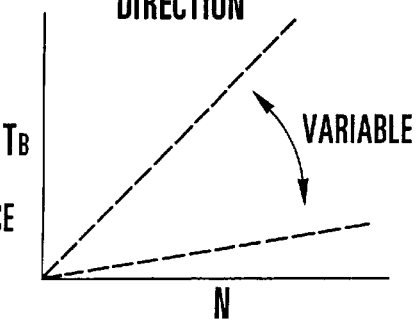

As shown in FIG. 6A, a variable resistor Rv is connected between the terminals 14-7a and 14-7b of the DC motor structure 14. During the operation of the valve 10 in the opening and closing directions, a brake torque $T_B$ in a direction opposite to the rotational direction and proportional to the rotation speed N is generated in the DC motor structure 14 to suppress the operation speed of the valve 10. In this case, desired braking characteristics (the characteristics of the brake torque $T_B$ with respect to the rotation speed N) can be obtained by changing the resistance of the variable resistor Rv. FIGS. 6B and 6C show the braking characteristics in the closing and opening directions, respectively. With this method, variations in quality of components, e.g., a gear, a spring, and the like can be absorbed, and variations in specifications can be coped with.

[Rectifying Element Method]

Figure 7A:
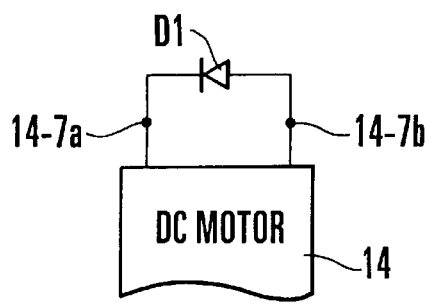
FIG. 7A, and FIGS. 7B and 7C are a connection diagram and graphs, respectively, for explaining the rectifying element method for obtaining a brake torque $T_B$.
Figures 7B, 7C:
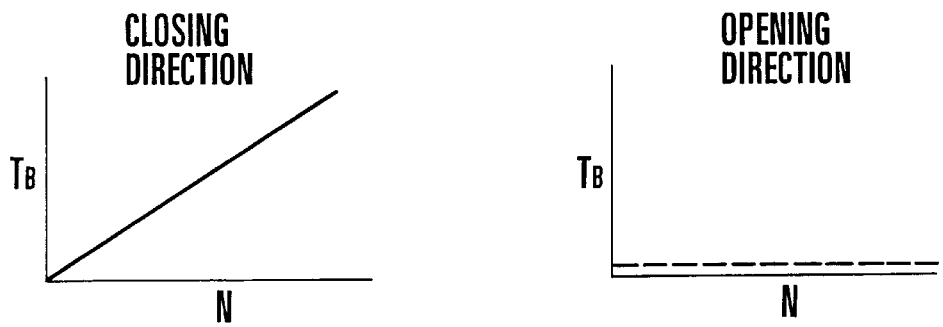

As shown in FIG. 7A, a rectifying diode D1 is connected between the terminals 14-7a and 14-7b of the DC motor structure 14. During the operation of the valve 10 in the closing direction, a brake torque $T_B$ in a direction opposite to the rotational direction and proportional to the rotation speed N is generated in the DC motor structure 14 to suppress the operation speed of the valve 10. In this case, during the operation of the valve 10 in the closing direction, a brake torque $T_B$ in the opposite direction to the rotational direction does not substantially occur. FIGS. 7B and 7C show the braking characteristics in the closing and opening directions, respectively. This method is particularly effective when the driving torque of the drive motor does not have a margin or the brake mechanism is of the spring return type, and as the drive motor, one having a low torque, i.e., a compact, inexpensive drive motor, can be used. The rectifying element is not limited to a diode, but, e.g., a rectifying element comprising a transistor can also be used instead.

[First Constant-Voltage Element Method]

Figure 8A:
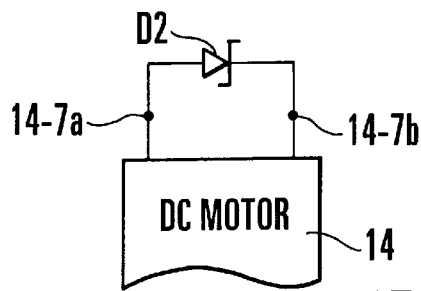
FIG. 8A, and FIGS. 8B and 8C are a connection diagram and graphs, respectively, for explaining the first constant-voltage element method for obtaining a brake torque $T_B$.
Figures 8B, 8C:
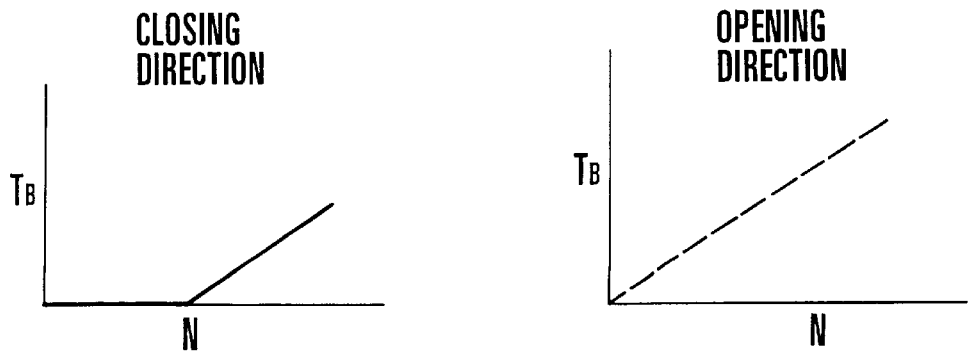

As shown in FIG. 8A, a Zener diode Dz is connected between the terminals 14-7a and 14-7b of the DC motor structure 14. During the operation of the valve 10 in the closing direction, when the rotation speed N exceeds a predetermined value, a brake torque $T_B$ in a direction opposite to the rotational direction and proportional to the rotation speed N is generated in the DC motor structure 14 to suppress the operation speed of the valve 10. In this case, during the operation of the valve 10 in the closing direction, if the rotation speed N does not exceed the predetermined value, a brake torque $T_B$ is not substantially generated. During the operation of the valve 10 in the opening direction, a brake torque $T_B$ in a direction opposite to the rotational direction and proportional to the rotation speed N is generated to suppress the operation speed of the valve 10. FIGS. 8B and 8C show the braking characteristics in the closing and opening directions, respectively. This method is effective when the rotation speed is not supposed to exceed the upper limit during high-speed rotation or when degradation in components, e.g., a gear, is to be prevented by decreasing the load acting on the gear.

[Second Constant-Voltage Element Method]

Figure 9A:
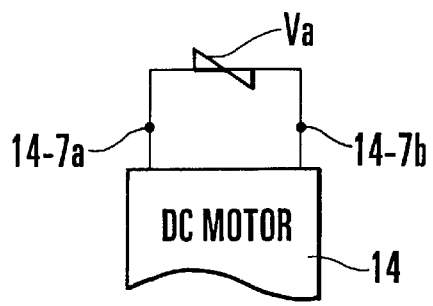
FIG. 9A, and FIGS. 9B and 9C are a connection diagram and graphs, respectively, for explaining the second constant-voltage element method for obtaining a brake torque $T_B$.
Figure 9B:
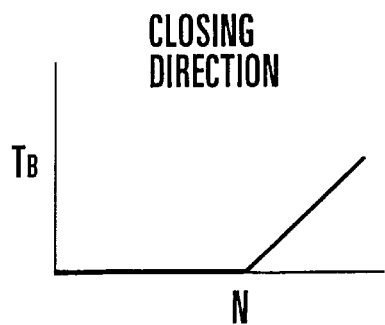
Figure 9C:
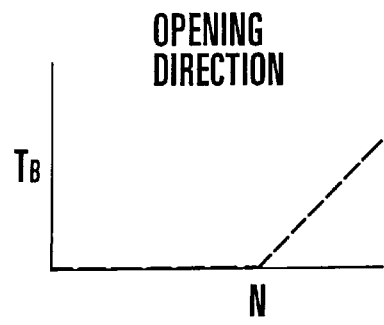

As shown in FIG. 9A, a varistor Va is connected between the terminals 14-7a and 14-7b of the DC motor structure 14. During the operation of the valve 10 in the closing and opening directions, when the rotation speed N exceeds a predetermined value, a brake torque $T_B$ in a direction opposite to the rotational direction and proportional to the rotation speed N is generated in the DC motor structure 14 to suppress the operation speed of the valve 10. In this case, during the operation of the valve 10 in the closing and opening directions, if the rotation speed N does not exceed the predetermined value, a brake torque $T_B$ is not substantially generated. FIGS. 9B and 9C show the braking characteristics in the closing and opening directions, respectively. This method is effective when the rotation speed is not supposed to exceed the upper limit during high-speed rotation or when degradation in components, e.g., a gear, is to be prevented by decreasing the load acting on the gear.

[Constant-Current Element Method (Current Suppressing Element Method)]

Figure 10A:
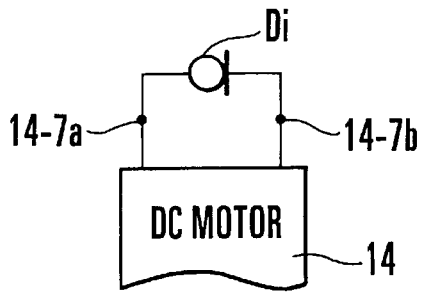
FIG. 10A, and FIGS. 10B and 10C are a connection diagram and graphs, respectively, for explaining the constant-current element method (current suppressing element method) for obtaining a brake torque $T_B$.
Figure 10B:
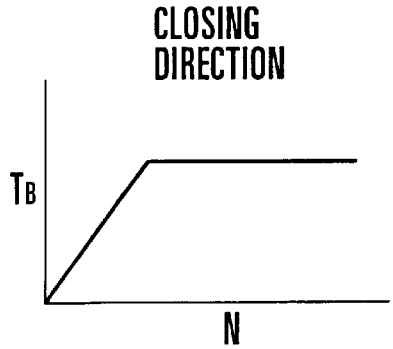
Figure 10C:
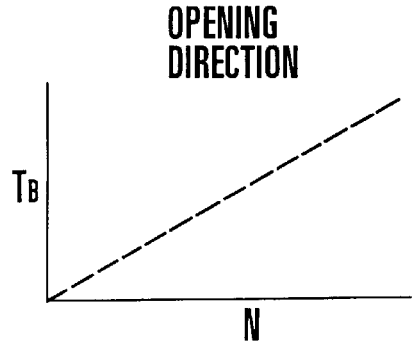

As shown in FIG. 10A, a constant-current diode D1 is connected between the terminals 14-7a and 14-7b of the DC motor structure 14. During the operation of the valve 10 in the closing direction, when the rotation speed N does not exceed a predetermined value, a brake torque $T_B$ in a direction opposite to the rotational direction and proportional to the rotation speed N is generated in the DC motor structure 14, and when the rotation speed N exceeds the predetermined direction, a brake torque $T_B$ of a constant value and in a direction opposite to the rotational direction is generated, thereby suppressing the operation speed of the valve 10. During the operation of the valve 10 in the opening direction, a brake torque $T_B$ in a direction opposite to the rotational direction and proportional to the rotation speed N is generated to suppress the operation speed of the valve 10. FIGS. 10B and 10C show the braking characteristics in the closing and opening directions, respectively. With this method, the brake torque $T_B$ becomes constant at a certain value, i.e., the current flowing in the DC motor structure 14 can be limited to a small value, and accordingly the DC motor structure 14 can serve for a long period of time.

[First Light-Emitting Element Method]

As shown in FIG. 11A, a light-emitting diode Dp is connected between the terminals 14-7a and 14-7b of the DC motor structure 14. During the operation of the valve 10 in the closing direction, the light-emitting diode Dp emits light, and a brake torque $T_B$ in a direction opposite to the rotational direction and proportional to the rotation speed N is generated to suppress the operation speed of the valve 10. In this case, during the operation of the valve 10 in the opening direction, a brake torque $T_B$ in a direction opposite to the rotational direction is not substantially generated. FIGS. 11B and 11C show the braking characteristics in the closing and opening directions, respectively. With this method, a current flows only when the valve 10 operates in the closing operation, and the light-emitting diode Dp emits light to indicate that the valve 10 is in the return operation.

[Second Light-Emitting Element Method]

As shown in FIG. 12A, a lamp bulb Lm is connected between the terminals 14-7a and 14-7b of the DC motor structure 14. During the operation of the valve 10 in the opening and closing directions, the lamp bulb Lm is lit, and a brake torque $T_B$ in a direction opposite to the rotational direction and proportional to the rotation speed N is generated to suppress the operation speed of the valve 10. FIGS. 12B and 12C show the braking characteristics in the closing and opening directions, respectively. With this method, a current flows both when the valve 10 operates in the closing and opening operations, and the lamp bulb Lm is lit to indicate that the valve 10 is in the operation.

[Second Embodiment]

Figure 13:
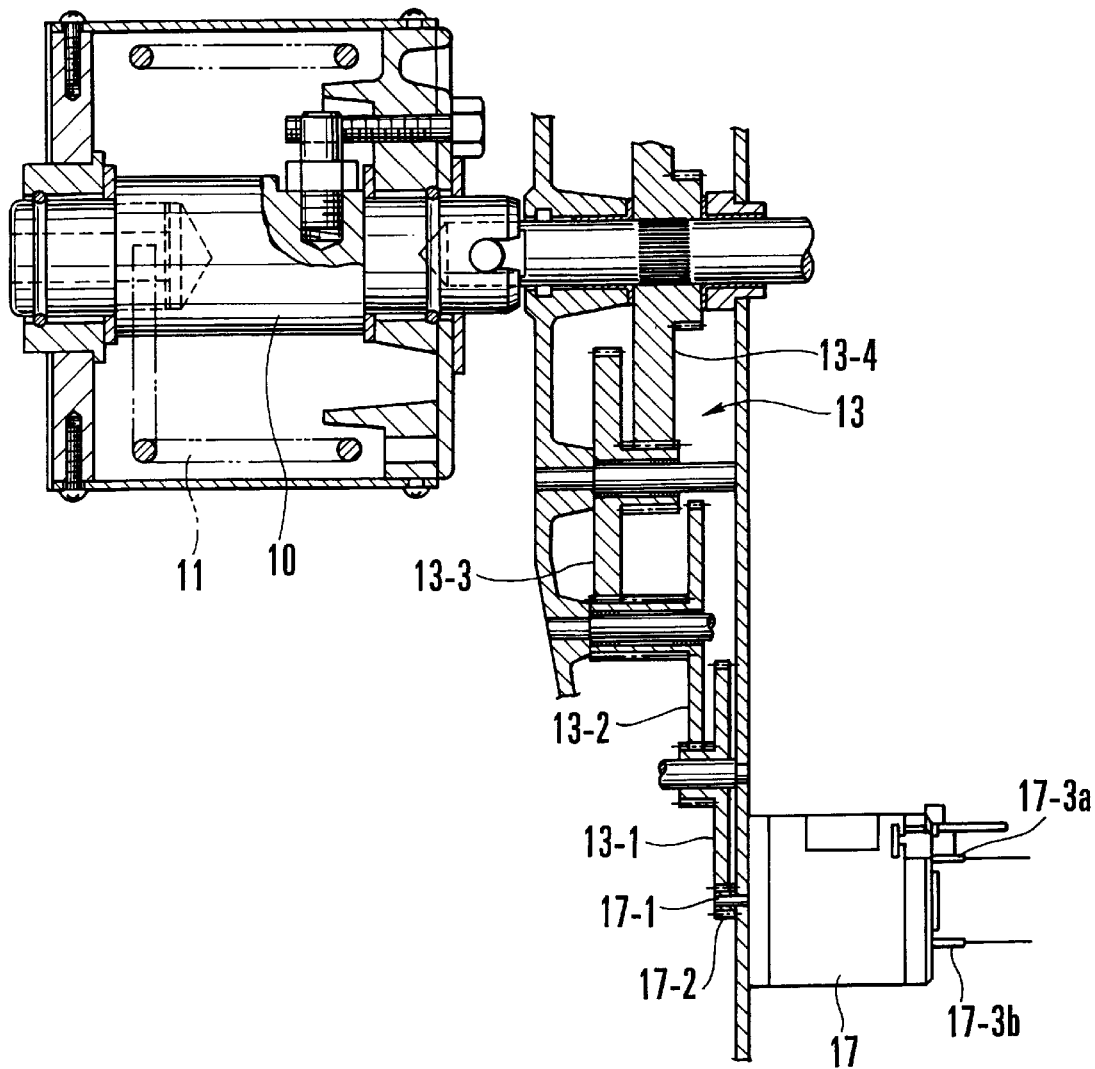
FIG. 13 is a partially sectional side view of a spring return type actuator according to the second embodiment of the present invention.

FIG. 13 shows a spring return type actuator according to the second embodiment of the present invention. In the second embodiment, the drive motor 12 of the first embodiment shown in FIG. 2 is replaced with a DC drive motor (DC motor) 17. The DC motor 17 has two functions, i.e., the functions of the drive motor 12 and DC motor structure 14 shown in FIG. 2. The DC motor 17 does not incorporate a mechanical clutch, and its output shaft 17-1 is rotationally connected to a reduction gear train 13 through a pinion 17-2. Except for this, the arrangement of this actuator is similar to that shown in FIG. 2, so that portions that are identical to those in FIG. 2 are denoted by the same reference numerals as in FIG. 2, and a detailed description thereof will be omitted.

Figure 14:
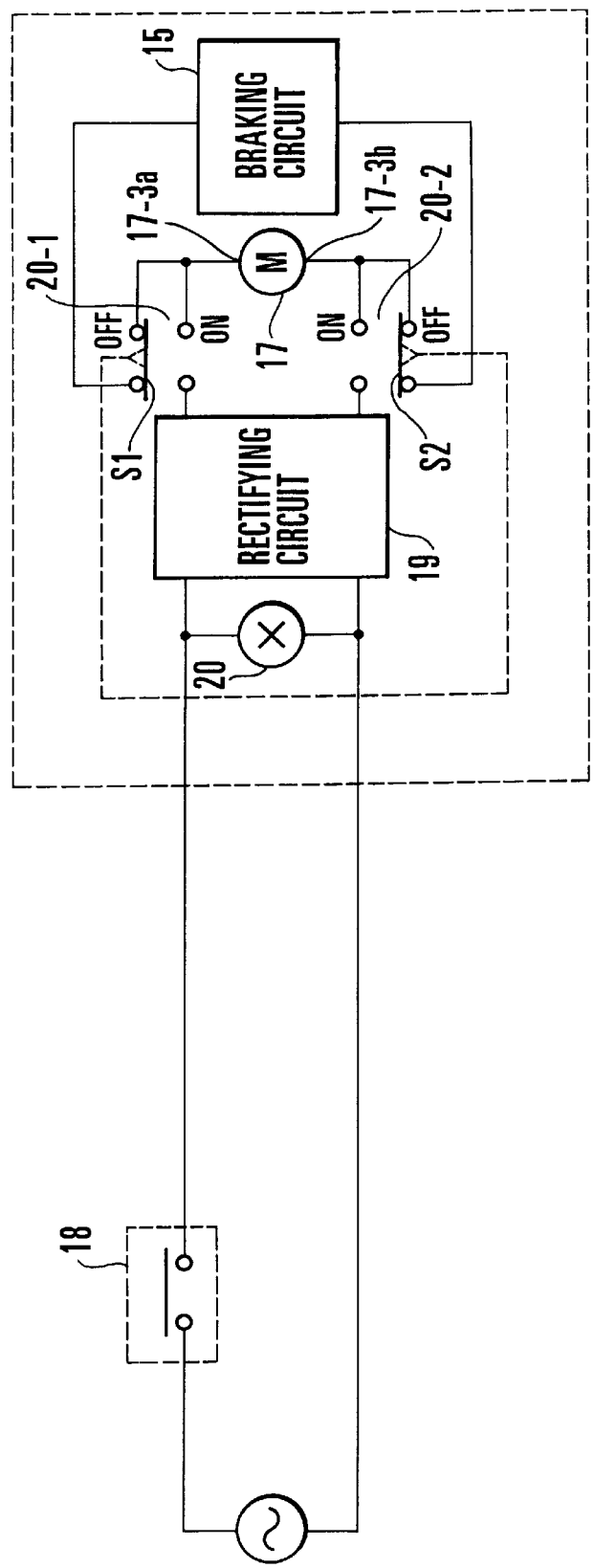
FIG. 14 is an electrical circuit diagram of the spring return type actuator shown in FIG. 13.

FIG. 14 shows the spring return type actuator shown in FIG. 13. Referring to FIG. 14, reference numeral 18 denotes an ON/OFF switch arranged on the supply line of power (AC power) to the DC motor 17 to switch the operation; 19, a rectifying circuit 19 for generating DC power from AC power input through the ON/OFF switch 18; 20, a relay; and 20-1 and 20-2, the contacts of the relay 20.

With the state of the contacts 20-1 and 20-2 shown in FIG. 14, power is not supplied to the relay 20, i.e., the ON/OFF switch 18 is OFF. In this state, movable contacts S1 and S2 of the relay contacts 20-1 and 20-2 are connected to the braking circuit 15 side, and terminals 17-3a and 17-3b of the DC motor 17 are short-circuited through a braking circuit 15. In contrast to this, when the ON/OFF switch 18 is turned on, the movable contacts S1 and S2 of the contacts 20-1 and 20-2 are connected to the rectifying circuit 19 side, and DC power is supplied from the rectifying circuit 19 to the DC motor 17. In this circuit arrangement, the relay 20 and the relay contacts 20-1 and 20-2 constitute a mode selection circuit for performing mode selection between the drive mode and the brake mode.

The operation of this spring return type actuator will be described with reference to the timing charts shown in FIGS. 15A to 15C. In this case, a valve 10 is used as an ON/OFF valve and is not held at an intermediate opening degree.

Figure 15A:
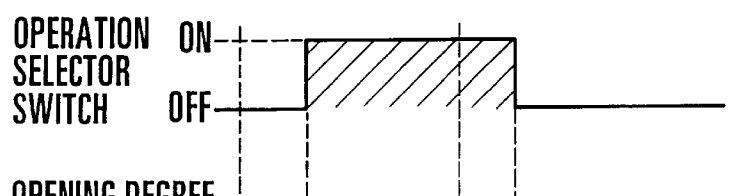
FIGS. 15A to 15C are timing charts for explaining the operation of the spring return type actuator shown in FIGS. 13 and 14.

As shown in FIG. 15A, when the operation selector switch 18 is OFF at point t0, the opening degree of the valve 10 is 0%. In this case, the movable contacts S1 and S2 of the relay contacts 20-1 and 20-2 are connected to the braking circuit 15 side, and the terminals 17-3a and 17-3b of the DC motor 17 are short-circuited through the braking circuit 15.

As shown in FIG. 15A, when the operation selector switch 18 is turned on at point t1, AC power supply to the rectifying circuit 19 is started. Simultaneously, the relay 20 is driven, and the movable contacts S1 and S2 of the relay contacts 20-1 and 20-2 are connected to the rectifying circuit 19 side. Hence, DC power from the rectifying circuit 19 is supplied to the DC motor 17. The DC motor 17 is rotated in the forward direction, and its forward rotation force is transmitted to the valve 10 through the reduction gear train 13, so that the valve 10 operates in the opening direction, as shown in FIG. 15B.

Figure 15B:
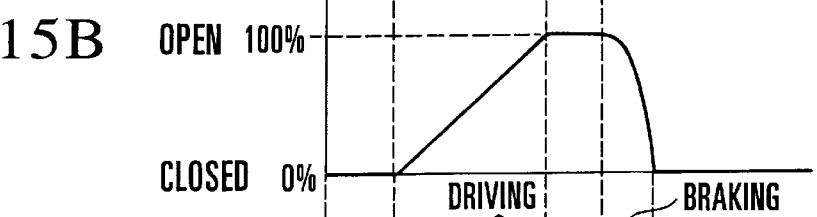
Figure 15C:
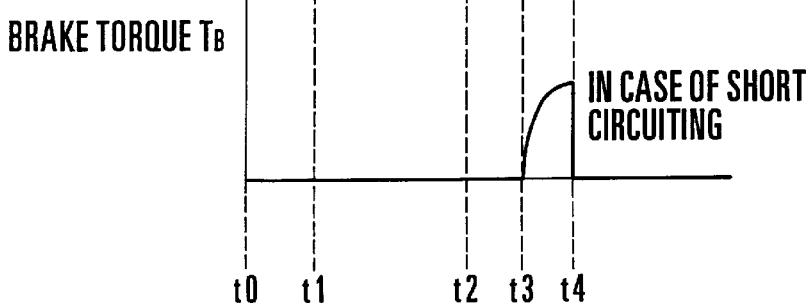
Figure 16A:
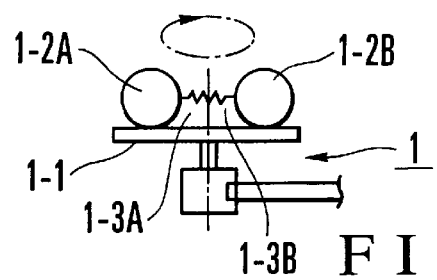
FIG. 16A, and FIGS. 16B and 16C are a structure view and graphs, respectively, for explaining a conventional inertia braking method utilizing weights.
Figure 16B:
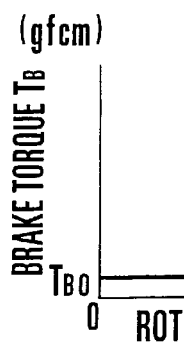
Figure 16C:
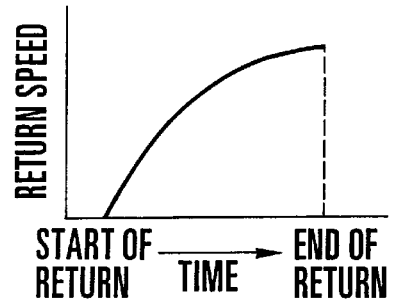
Figure 17A:
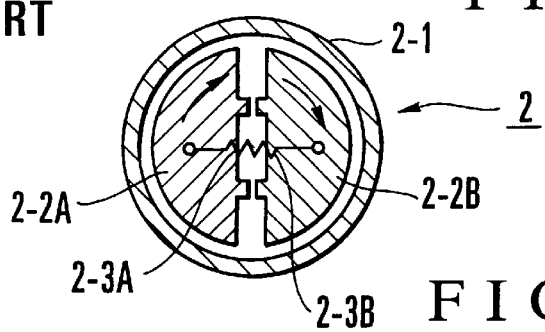
FIG. 17A, and FIGS. 17B and 17C are a structure view and graphs, respectively, for explaining a conventional governor method utilizing friction.
Figure 17B:
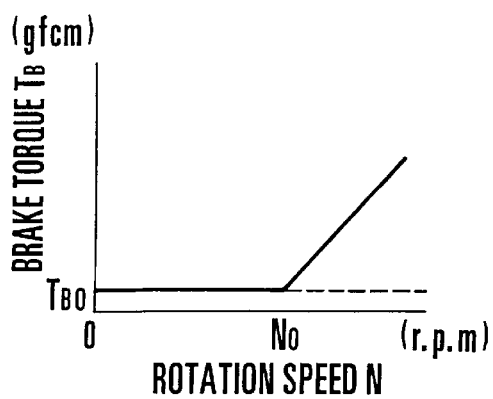
Figure 17C:
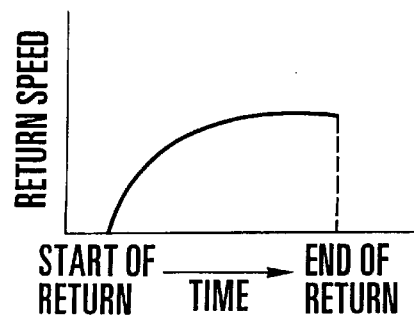
Figure 18A:
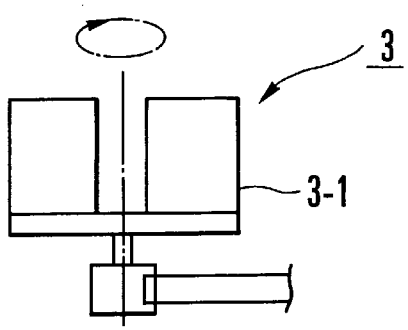
FIG. 18A, and FIGS. 18B and 18C are a structure view and graphs, respectively, for explaining a conventional impeller method utilizing air resistance.
Figure 18B:
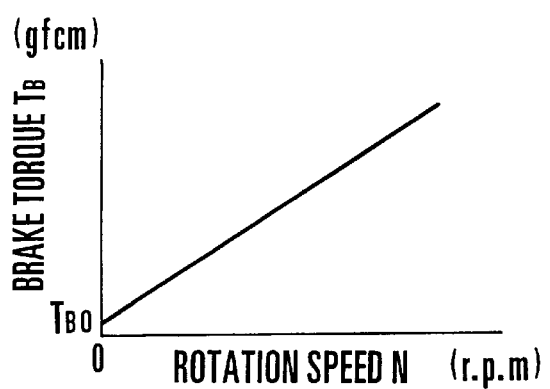
Figure 18C:
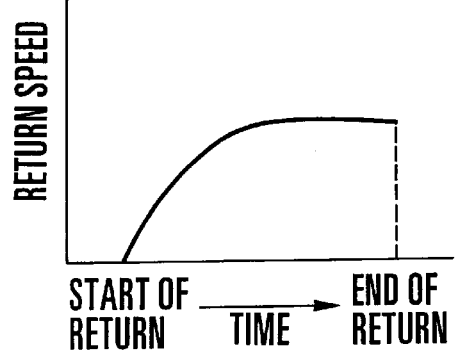

As shown in FIG. 15B, the valve 10 is fully open at point t2. In this case, the operation selector switch 18 is kept ON, and the DC motor 17 remains to serve as the drive motor to maintain the full-open state of the valve 10 against the force of the return spring 11. While the valve 10 operates in the opening direction, no brake torque $T_B$ is generated, as a matter of course.

As shown in FIG. 15A, when the operation selector switch 18 is turned off at point t3, AC power supply to the rectifying circuit 19 is disconnected, and the movable contacts S1 and S2 of the relay contacts 20-1 and 20-2 are connected to the braking circuit 15 side. When AC power supply to the rectifying circuit 19 is disconnected, DC power supply to the DC motor 17 is also disconnected. The valve 10 accordingly tries to return in the closing direction at a high speed with the restoring force of the return spring 11.

At this time, Fleming's left-hand rule applies to the DC motor 17. As shown in FIG. 15C, a brake torque $T_B$ in a direction opposite to the direction of rotation caused by a restoring force F of the return spring 11 is generated during a period from point t3 to t4. This brake torque $T_B$ is proportional to the rotation speed N. Since the rotation speed N at this time is large, the brake torque $T_B$ is large, and the return speed of the valve 10 is largely moderated. In other words, in this case, the DC motor 17 serves as the brake.

As shown in FIG. 15B, the valve 10 is fully closed at point t4, and the brake torque $T_B$ disappears. The operation selector switch 18 stays OFF, and the movable contacts S1 and S2 of the relay contacts 20-1 and 20-2 remain to be connected to the braking circuit 15 side.

In the second embodiment as well, the braking circuit 15 need not always be short-circuited, and various types of methods identical to those described in the first embodiment are possible.

In the present invention, as the motor structure for obtaining the brake torque $T_B$, a DC machine type motor (DC servo motor), a synchronous machine type motor (stepping motor, a brushless motor), or the like can be employed.

As has been described above, according to the present invention, at least during the return operation of the operation end, a torque in a direction opposite to the rotational direction is generated in the motor structure to suppress the operation speed of the operation end. A braking force proportional to the rotation speed can be stably obtained, and a large braking force can be obtained with a compact structure without increasing the size. If a variable resistor element is connected between the two terminals of the motor structure to form a braking means, the return time of the operation end can be changed by selecting the resistance of this variable resistor element.

What is claimed is:

1. A power actuator comprising:
    an operating member supported for rotation;
    a drive source having a holding torque when power is not supplied;
    a rotation transmitting mechanism for transmitting a rotation force from said drive source to said operating member;
    a power clutch for separating between said operating member and driving source as not to transmit a rotation force from said drive source to said operating member, when a power failure occurs;
    a return spring for imparting said operating member with a returning tendency to return the said operating member to rotating limit; and
    a brake mechanism having a rotator which rotates by a return force of said operating member
    wherein return rotation of said rotator is damped by an induced current generated during the return operation of said rotator, when a power failure occurs.

2. A mechanism according to claim 1, wherein said induced current flows through a braking circuit.

3. A mechanism according to claim 2, wherein said braking circuit has a resistor element.

4. A mechanism according to claim 2, wherein said braking circuit has a variable resistor element.

5. A mechanism according to claim 2, wherein said braking circuit has a rectifying element.

6. A mechanism according to claim 2, wherein said braking circuit has a constant-voltage element.

7. A mechanism according to claim 2, wherein said braking circuit has a constant-current element.

8. A mechanism according to claim 2, wherein said braking circuit has a light-emitting element.

9. A powered actuator comprising:
- a drive motor having a holding torque when the power is not supplied;
- an operation end rotatably connected to an output shaft of said drive motor through a reduction gear train and a clutch;
- a spring for imparting said operation end with a returning tendency;
- an operation selector switch for switching a rotational direction of said drive motor;
- clutch drive means for connecting said clutch upon reception of power supplied to said drive motor as a shunt input;
- a motor structure having an output shaft rotatably connected midway along a transmission line of a rotation force supplied from said drive motor, including said reduction gear train, to said operation end; and
- braking means for allowing electric current to flow through said motor structure so as to magneto-electrically generate to said output shaft of said motor structure, a torque in a direction opposite to a returning direction, thereby suppressing a returning operation speed of said operation end when said operation end performs a returning operation while said clutch is disconnected.

10. A mechanism according to claim 9, wherein said braking means has a braking circuit for short-circuiting two terminals of said motor structure.

11. A mechanism according to claim 9, wherein said braking means has a resistor element connected between two terminals of said motor structure.

12. A mechanism according to claim 9, wherein said braking means has a variable resistor element connected between two terminals of said motor structure.

13. A mechanism according to claim 9, wherein said braking means has a rectifying element connected between two terminals of said motor structure.

14. A mechanism according to claim 9, wherein said braking means has a constant-voltage element connected between two terminals of said motor structure.

15. A mechanism according to claim 9, wherein said braking means has a constant-current element connected between two terminals of said motor structure.

16. A mechanism according to claim 9, wherein said braking means has a light-emitting element connected between two terminals of said motor structure.

* * * * *

UNITED STATES PATENT AND TRADEMARK OFFICE
CERTIFICATE OF CORRECTION

PATENT NO.    : 6,184,604 B1
DATED         : February 6, 2001
INVENTOR(S)   : Takano et al.

It is certified that error appears in the above-identified patent and that said Letters Patent is hereby corrected as shown below:

<u>Title page, Item [54] and Column 1, lines 1-2,</u>
Title, please delete "BRAKE MECHANISM AND POWERED ACTUATOR" and insert -- POWERED ACTUATOR --

Signed and Sealed this

Twenty-ninth Day of June, 2004

JON W. DUDAS
*Acting Director of the United States Patent and Trademark Office*